United States Patent [19]

Takahashi et al.

[11] Patent Number: 4,758,904
[45] Date of Patent: Jul. 19, 1988

[54] APPARATUS FOR RECORDING AND/OR REPRODUCING AN ADDITIONAL INFORMATION SIGNAL

[75] Inventors: Takao Takahashi, Tokyo; Kenji Nakano, Kanagawa; Hiroshi Okada, Tokyo, all of Japan

[73] Assignee: Sony Corporation, Tokyo, Japan

[21] Appl. No.: 881,327

[22] Filed: Jul. 2, 1986

[30] Foreign Application Priority Data

Jul. 9, 1985 [JP] Japan .................. 60-150429

[51] Int. Cl.[4] .................. G11B 5/02; G11B 15/18
[52] U.S. Cl. .................. 360/19.1; 360/72.2
[58] Field of Search .................. 360/8, 10.1, 27, 49, 360/19.1, 72.2

[56] References Cited

U.S. PATENT DOCUMENTS 4,120,006  10/1978  Nagami et al. .................. 360/72.2
4,620,239  10/1986  Fuji .................. 360/8

Primary Examiner—Vincent P. Canney
Attorney, Agent, or Firm—Alvin Sinderbrand

[57] ABSTRACT

In a helical scan apparatus having a rotary head or heads for recording and/or reproducing video and audio signals in oblique tracks on a magnetic tape with the recorded audio signals being recorded in overscan areas of the oblique tracks and with the pitch of the tracks being different as a result of changes in the tape speed for different recording modes; index signals are recorded by the rotary head or heads at predetermined positions in the overscan areas of a plurality of the oblique tracks for a period of time dependent upon the recording mode previously used for recording the video and audio signals. Therefore, in a program search operation employing high speed playback, the index signals can be extracted from the output of the rotary head or heads for identifying a respective program or event irrespective of the recording mode with which the video and audio signals were recorded.

8 Claims, 7 Drawing Sheets

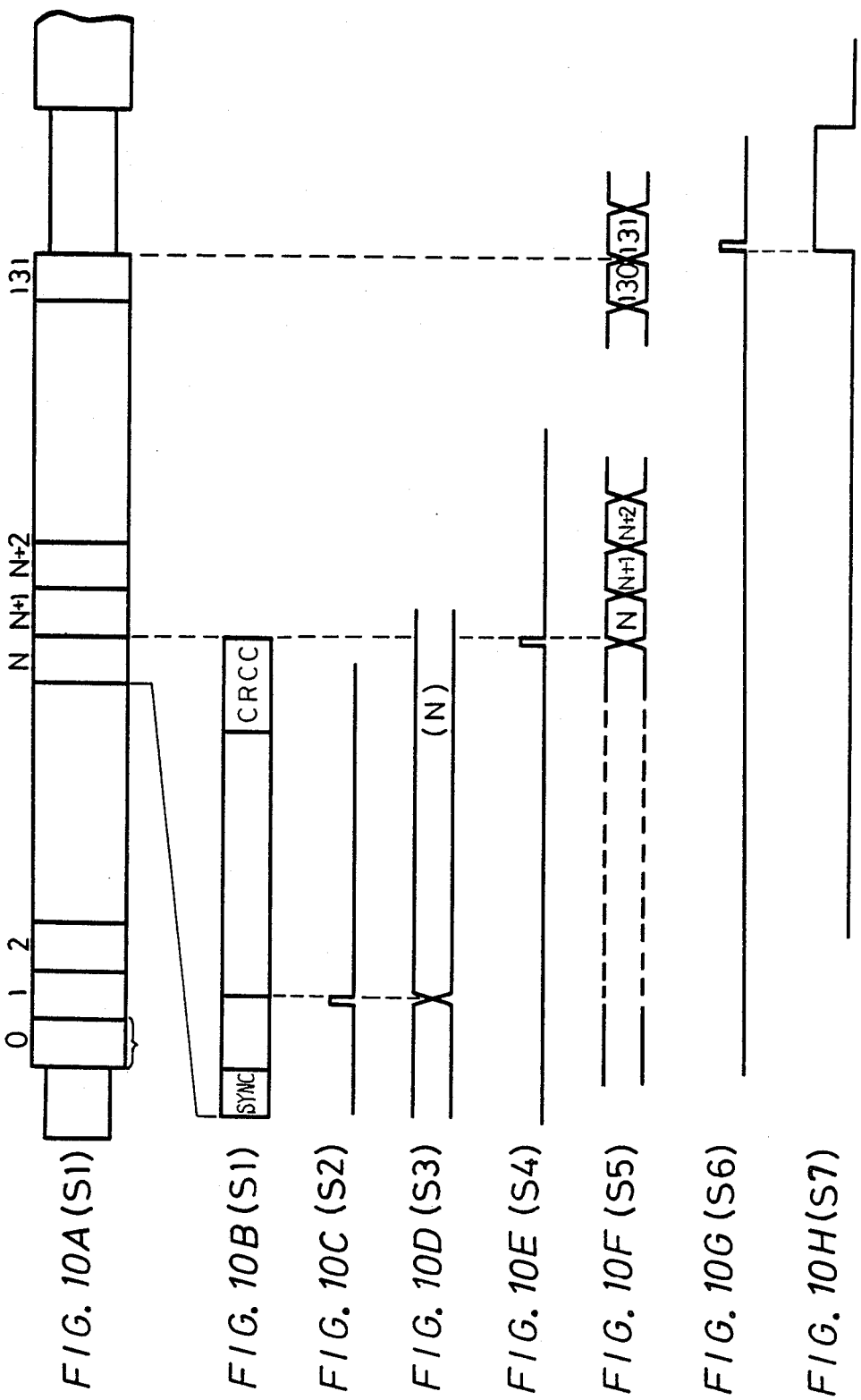

APPARATUS FOR RECORDING AND/OR REPRODUCING AN ADDITIONAL INFORMATION SIGNAL

BACKGROUND OF THE INVENTION

1. Field of the Invention invention relates generally to an apparatus for recording and/or reproducing a PCM (pulse-code modulated) audio signal by a rotary head, and more particularly is directed to an apparatus for recording an index signal, such as, a signal indicative of a starting point of a recorded event, in an oblique track in a so-called after-recording mode, or for erasing such index signal.

2. Description of the Prior Art

An 8 mm video tape recorder can be used in a normal recording mode in which an audio signal is frequency modulated prior to being mixed with a color video signal and then recorded in such a way that the audio signal can be frequency separated from the color video signal upon playback, and also in an optional recording mode in which the audio signal is pulse-code modulated and recorded in a so-called overscan area which is separate from the main area of each oblique track in which the color video signal is recorded.

As is shown on FIG. 1, a rotary head assembly of the 8 mm video tape recorder includes recording and reproducing rotary magnetic heads HA and HB. These rotary magnetic heads HA and HB have gaps with different azimuth angles and are mounted on a rotary drum 1 with an angular spacing of 180° therebetween. Rotary heads HA and HB are rotated at a rotational speed equal to the standard frame frequency (30 Hz) in the direction indicated by arrow 3H and protrude slightly from the peripheral surface of the rotary drum 1. A magnetic tape 2 is wrapped around the peripheral surface of rotary drum 1 over an angular extent of 221° and is suitably transported at a constant speed in the direction indicated by an arrow 3T.

Accordingly, tracks 4A and 4B, each having a length corresponding to an angular extent of 221° on the surface of drum 1, are alternately formed on tape 2 by rotary heads HA and HB, respectively, as shown in FIG. 2. In a so-called overscan area AP of each track having an angular extent of 36° measured from a point at which the rotary heads HA and HB start scanning the tracks 4A and 4B, there is recorded an audio signal corresponding to one field period of the video signal and which has been pulse-code modulated and time compressed. On the succeeding main area AV of each track having an angular extent of 180°, there are recorded a color video signal of one field period, an FM (frequency modulated) audio signal of one field and tracking pilot signals, respectively. The remaining area of each track which has an angular extent of 5° is assigned as a spare area in which the head is disengaged from the tape.

Further, the PCM audio signal can be recorded and reproduced by the 8 mm video tape recorder in a so-called "audio-use" mode in which, as disclosed in detail in U.S. Pat. No. 4,542,419, issued on Sept. 17, 1985 and having an assignee in common herewith, the main recording area AV of each track is also used for recording the PCM audio signal. In such audio-use or multi-PCM mode, the 8 mm video tape recorder becomes a PCM audio signal recording and/or reproducing apparatus in which PCM audio signals can be recorded in multiple channels. More specifically, as shown on FIG. 3, in the audio-use or multi-PCM mode, the area AV of each track corresponding to the angular range of 180° is divided equally by 5 and the PCM audio signal is recorded in a selected one of these divided portions during scanning of each track. Therefore, the whole area of each track shown on FIG. 2, including the area AP and the area AV, is divided into 6 track areas AP1 to AP6, each corresponding to an angular range or extent of 36°, and first to sixth track channels are formed by the same numbered segments or track areas AP1 to AP6 of the respective skewed tracks 4A,4B,4A, 4B, etc., shown on FIG. 3, whereby a suitably time compressed PCM audio signal can be recorded in any desired channel. For example, the PCM audio signal may be recorded first in the segments or track areas AP1 of the successive tracks 4A,4B, from one end of the tape to the other. Thereafter, the PCM audio signal may be further recorded in segments or track areas AP2 of the successive tracks from one end of the tape to the other. Accordingly, PCM audio signals can be recorded in and reproduced from each of the six channels with the result that, in the audio-use or multi-PCM mode shown on FIG. 3, the tape 2 has a recording time or capacity six times as long as when a PCM audio signal is recorded only in the overscan area AP of each track, as on FIG. 2.

In the case of the multi-PCM mode, if recording and/or reproducing is effected in or from each segment track area, the PCM signal processing circuit used therefor may be the signal processing circuit provided for processing the PCM audio signal recorded in the single channel constituted by the track areas AP in the prior art 8 mm video tape recorder.

The track format of the above mentioned 8 mm video tape recorder will now be described more fully with reference to FIG. 4, in which contact of the rotary head with the tape 2, that is, the starting point of the track, begins at the right-hand side where there is provided a tracing starting area 11 corresponding, in extent, to a 5° rotation angle of a rotary head. At the rear or trailing portion 12 of tracing starting area 11, a period having an angular range or extent of 2.06° and corresponding to 3H of the video signal, where H is the horizontal period, is assigned as a preamble area which will become a clock run-in area synchronized with the succeeding PCM data. Following clock run-in area 12, there is provided a PCM data recording area 13 having an angular extent of 26.32° and in which a time compressed PCM audio signal is recorded. A postamble area 14 also having an angular extent of 2.06° (3H) follows the PCM data recording area 13 so as to be used as a back margin area to cope with the displacement of the recording position when the recording is carried out in the so-called after-recording mode. A next area 15 having an angular extent of 2.62° is assigned as a guard band area for separating the video signal area 16 which follows from the PCM data area 13. The video recording area 16 has an angular range of 180° as earlier noted for receiving the recorded video signal of one field period. Next to the area 16, there is provided a head disengaging area 17 having an angular extent of 5° and in which the rotary head is disengaged freely from the magnetic tape.

A track format used in the multi-PCM mode will now be described with reference to FIG. 5 in which it is shown that the format for each segment track area for the PCM audio signal is exactly the same as the format for the PCM audio area in the normal 8 mm video tape recorder. Thus, each segment track area in FIG. 5 is formed of a tracing starting area 21, a preamble area 22, a PCM data area 23, a postamble area 24 and a guard band area 25. The same format is assigned to each of the segment track areas AP1 to AP6 on FIG. 3.

Generally, the PCM data is recorded on the tape with the binary code data having a logic level "1" or "0" being modulated to signals of respective frequencies. In the 8 mm video tape recorder, for example, the data having the logic level "1" is modulated to, or represented by a signal having a frequency of 5.8 MHz which is recorded, while the data having the logic level "0" is modulated to, or represented by a signal having a frequency 2.9 MHz which is recorded. In the prior art, only the data having the logic level "1", that is, the signal having the frequency 5.8 MHz, is recorded in each preamble area 12 or 22 and in each postamble area 14 or 24.

A so-called program search method for locating a starting point of a recorded event in the 8 mm video tape recorder mode and the multi-PCM mode has been proposed by a person or persons having a duty of assignment to the assignee of the present application and is described in U.S. patent application Ser. No. 838,626, filed on Mar. 11, 1986. In accordance with such method, an index signal is recorded in, for example, the postamble area 14 or 24 of each track format described above, and this index signal is used to access the starting point of the recorded event on the tape. Moreover, the index signal can be recorded and/or reproduced by the rotary heads so that stationary recording and reproducing heads are not required for the index signal. Further, an area specifying signal for identifying the postamble area as the area receiving the index signal is generated, whereby the index signal can be recorded, or the recorded index signal can be erased, within such area specified by the area specifying signal. When the index signal is to be inserted into or erased from a tape on which the PCM data is already recorded, the user depresses an index signal button when the tape is at a position at which the index signal should be inserted or erased, and the index signal is recorded or erased within the index area during a predetermined time period.

In accordance with the above described earlier proposal, an index signal can be recorded or erased by the rotary head or heads so that a special stationary head for the index signal is not required. Further, since the index signal is recorded in an area separated from the track areas for recording of the PCM data and the video signal, it is possible to insert or erase the index signal in the after-recording mode.

It is further to be noted that, in the 8 mm video tape recorder, the tape speed can be selected to be either a first tape speed for an SP (short play) mode or a second tape speed, which is half the first tape speed, for an LP (long play) mode.

FIGS. 6 and 7 typically illustrate recording track patterns for the SP mode and the LP mode, respectively, at the portions of the tracks near to the PCM areas indicated at AP on FIG. 2. In FIGS. 6 and 7, the hatched areas each represent a postamble area 14 or 24 (FIGS. 5 and 6) into which the index signal is inserted or recorded, that is, the index area. It will be clear from a comparison of FIGS. 6 and 7, that the recording track pitch TP$_1$ in the LP mode is substantially smaller than the recording track pitch TP$_2$ in the SP mode.

When the index signal is inserted in the afterrecording mode or erased, the index signal is recorded in, or erased from, the respective area of each track during a predetermined time period as mentioned before, and as indicated by the hatched areas I$_{A1}$ and I$_{A2}$ on FIGS. 7 and 6, respectively. If the index signal is inserted or recorded in such areas I$_{A2}$ and I$_{A1}$ during the same time periods in the SP and LP modes, respectively, it will be clear form FIGS. 6 and 7 that the length L$_1$ along the tape occupied by tracks having the index signal inserted in the LP mode is shorter than, for example, one-half the length L$_2$ along the tape occupied by tracks having the index signal inserted in the SP mode.

As a result of the above, when the starting point of a recorded event on the slant track is accessed in the high speed search mode and the tape speed used in the high speed search mode is the same whether the event was recorded in the SP mode or in the LP mode, there is the possibility that the rotary heads HA and HB in obliquely scanning the tracks, as shown by arrows S$_2$ and S$_1$ on FIGS. 6 and 7, will pick up the index signal in the SP mode, but not in the LP mode.

OBJECTS AND SUMMARY OF THE INVENTION

Accordingly, it is an object of this invention to provide an improved apparatus for recording and/or reproducing an additional information signal, such as, the mentioned index signal, and which can avoid the problems encountered in the prior art.

It is another object of this invention to provide an improved apparatus having SP and LP modes for recording and/or reproducing an information signal along with an index signal, as aforesaid, and in which, when the apparatus is used in an 8 mm video tape recorder mode with the recording track pitch characteristic of the LP mode, the index signal is inserted for a time period longer than that employed for the SP mode.

It is a further object of this invention to provide an apparatus for recording and/or reproducing an information signal along with an index signal and which can positively and easily carry out a program search for accessing, with reference to the index signal, a starting point of an event in the information signal recorded in oblique tracks on a tape.

According to an aspect of the present invention, there is provided a helical scan apparatus for recording and/or reproducing an additional information signal, such as, an index signal, on a magnetic record medium having video and audio signals recorded thereon in oblique tracks with the recorded audio signals being arranged in an extended end portion or overscan area of each of the oblique tracks and with the pitch of the oblique tracks being different for different recording modes, and the apparatus comprises:

reproducing means for reproducing said video and audio signals; means for detecting the recording mode used for recording said video and audio signals on said magnetic record medium; means for generating index signals; means for generating an index area signal; means for generating a recording period signal according to the output of said recording mode detecting means; recording means for recording said index signal; and control means for controlling said recording means to record said index signals at positions determined by said index area signal in said extended end portions of a plurality of said oblique tracks in series during a time period determined by said recording period signal.

The above, and other objects, features and advantages of the present invention, will become apparent from the following detailed description of a preferred embodiment which is to be read in conjunction with the accompanying drawings, throughout which the same reference numerals designate like elements and parts.

BRIEF DESCRIPTION OF THE DRAWINGS

FIGS. 10A to 10H are timing charts to which reference is made in explaining the operation of the apparatus of FIG. 8.

DESCRIPTION OF THE PREFERRED EMBODIMENTS

Figure 8:
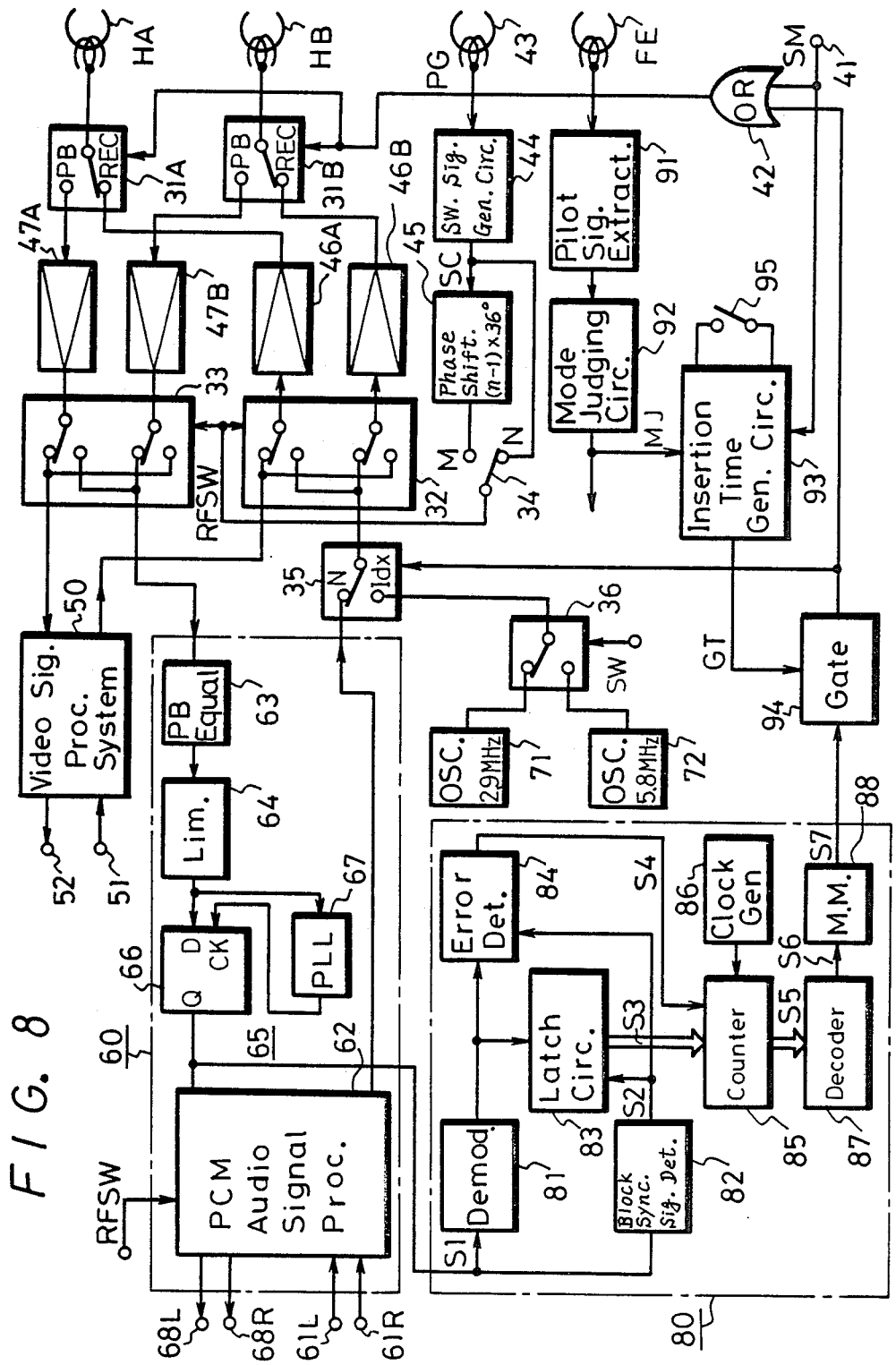
FIG. 8 is a block diagram showing an apparatus for recording and/or reproducing an additional information or index signal according to an embodiment of this invention.

In FIG. 8, there is shown an apparatus according to an embodiment of this invention for recording and/or reproducing video and PCM audio signals and also an additional information signal, for example, an index signal, with the position or area in which the index signal is recorded being determined by an area signal generated from address data included in the PCM data. More particularly, the PCM data for each track is arranged so that an information signal, for example, the audio signal and the like corresponding to a field period, is divided into a plurality of blocks and a block synchronizing signal and a block address signal are added to each of the divided blocks.

Figure 9:
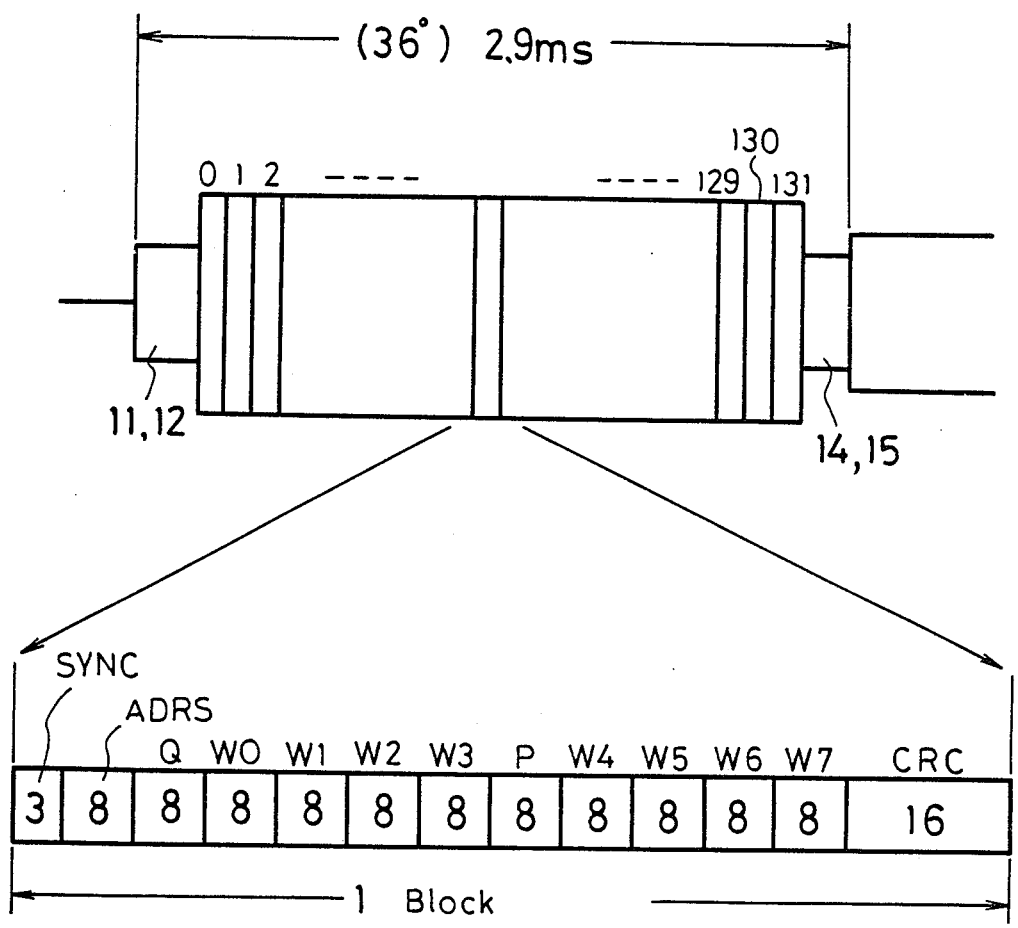
FIG. 9 is a schematic diagram to which reference will be made in explaining the arrangement of the PCM data.

In the case of the 8 mm video tape recorder, as shown in FIG. 9, the PCM audio data of each track is formed of 132 blocks and each block is formed of a block synchronizing signal SYNC of 3 bits, a block address word ADRS of 8 bits, error correction parity words P and Q of 8 bits each, audio data words W0 to W7 each of 8 bits and an error detection CRC (cyclic redundancy check) code of 16 bits. The CRC code is generated for the words of the respective block from address word ADRS up to the data word W7.

The address word ADRS indicates the sequential order (block number) of the block with respect to the block data for one track. Accordingly, the data of each block address indicate an absolute address or position of the PCM audio track recorded on the tape. This absolute address or position is not changed even if the track pattern is formed with a different timing. Therefore, in the embodiment of the invention to be described below with reference to FIG. 8, the block address data in the PCM data is detected and an index area specifying signal is formed on the basis of this block address data.

Referring in detail to FIG. 8, it will be seen that the apparatus there shown for recording and/or reproducing video and PCM audio signals and an additional information signal according to this invention includes recording and/or reproducing change-over switching circuits 31A and 31B to which a recording or reproducing switching signal SM from a terminal 41 is applied through an OR gate 42. Each of switching circuits 31A and 31B engages a recording terminal REC upon recording and is changed-over to engage a playback terminal PB upon reproducing.

Rotary head change-over switching circuits 32 and 33 are operated by a head switching signal RFSW to be alternately disposed in the positions shown in full lines and in dotted lines respectively, at every ½ revolution of the rotary recording/reproducing heads HA and HB.

A switch 34 is provided to select the timing of switching signal RFSW for a normal mode and a multi-PCM mode, respectively. More specifically, for the normal mode, the movable contact of switch 34 is engaged with a terminal N, at which time, a pulse PG having a frequency of 30 Hz and being generated from a pulse generator 43 and indicative of the absolute rotary phase of rotary heads HA and HB is supplied to a switching signal generating circuit 44 from which a square wave signal SC having a duty ratio of 50% is derived. This square wave signal SC is supplied, as is, through switch 34 to switching circuits 32 and 33 as the switching signal RFSW.

For the multi-PCM mode, the movable contact of switch 34 engages a terminal M so that, at that time, square wave signal SC from the switching signal generating circuit 44 is supplied through a phase shifter circuit 45 by which, in accordance with the segment track area specified, the square wave signal SC is phase-shifted by $36° \times (n-1)$, in which n is an integer corresponding to the segment track area number, for example, $n=1$ for the segment track area AP1, $n=2$ for AP2, ... $n=6$ for AP6. The suitably phase-shifted signal from circuit 45 is supplied through switch 34 to switching circuits 32 and 33 as the switching signal RFSW for the multi-PCM mode. The switching signal RFSW is also supplied to a PCM audio signal processor 62 included in a PCM signal system 60 and which generates a PCM area signal indicative of the specified one of the segment track areas AP1–AP6.

Figure 4:
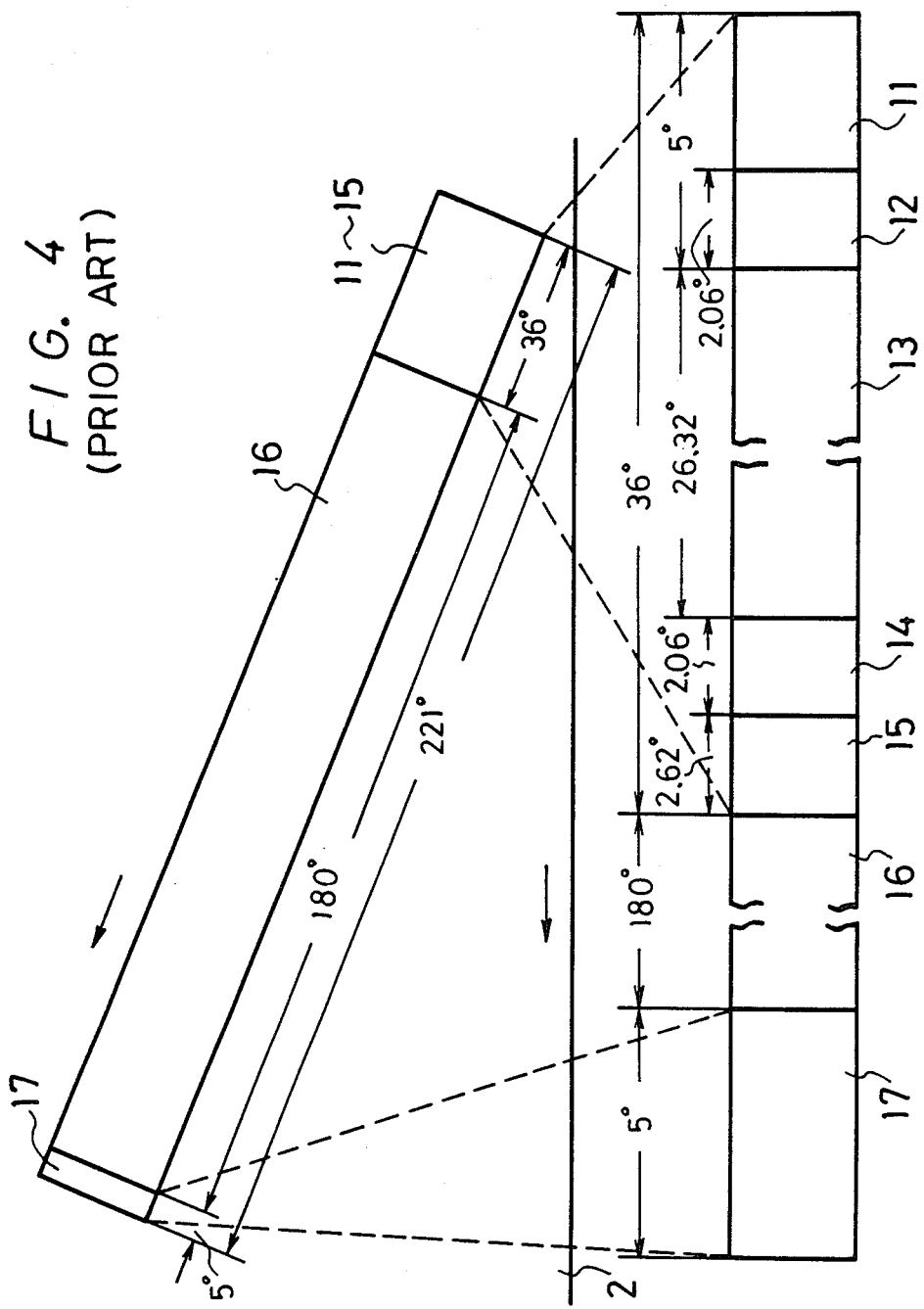
FIGS. 4 and 5 are schematic diagrams showing tracks formats used in the recording modes of FIGS. 2 and 3, respectively.

The recording mode of the apparatus of FIG. 8 will now be described, as follows:

An input video signal applied to an input terminal 51 is supplied to a video signal system 50 in which it is suitably processed. The output signal from video signal system 50 is then supplied to switching circuit 32. With switch 34 engaging its contact N for selecting the normal PCM mode, switching circuit 32 is alternately switched by switching signal RFSW at every half revolution of rotary heads HA and HB which are controlled by a drum phase servo taking the pulse PG as a reference phase so that when rotary head HA scans the area AV of a track 4A described before in connection with FIGS. 2 and 4, the video signal is supplied through a recording amplifier 46A and switching circuit 31A to rotary head HA and is thereby recorded on this area AV of the respective track 4A. In like manner, when rotary head HB scans the area AV of a track 4B, the video signal is supplied through a recording amplifier 46B and switching circuit 31B to rotary head HB and is thereby recorded on the area AV of the respective track 4B.

Left and right channel audio signals applied to input terminals 61L and 61R are both supplied to PCM audio signal processor 62 and are therein processed to PCM data.

Figure 1:
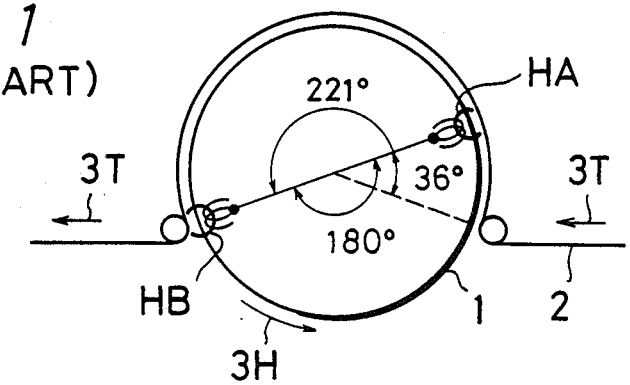
FIG. 1 is a schematic diagram showing one example of a rotary head assembly of a known 8 mm video tape recorder to which the present invention is applied.
Figure 2:
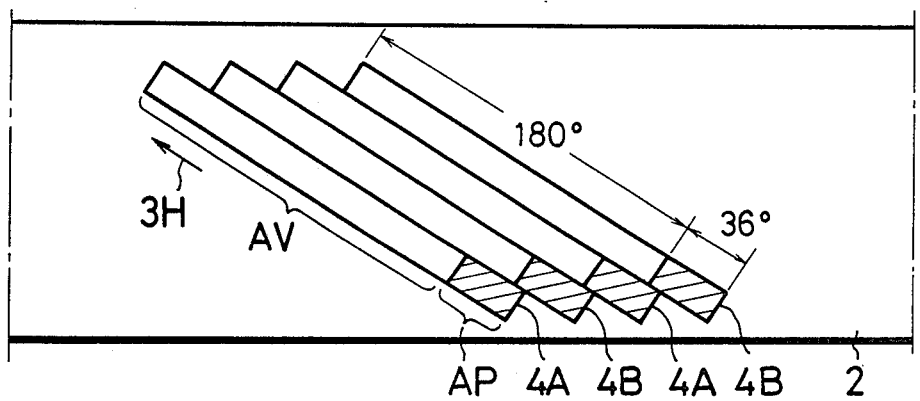
FIGS. 2 and 3 are schematic diagrams showing recording track patterns formed by the rotary head assembly of FIG. 1 for different recording modes thereof.
Figure 3:
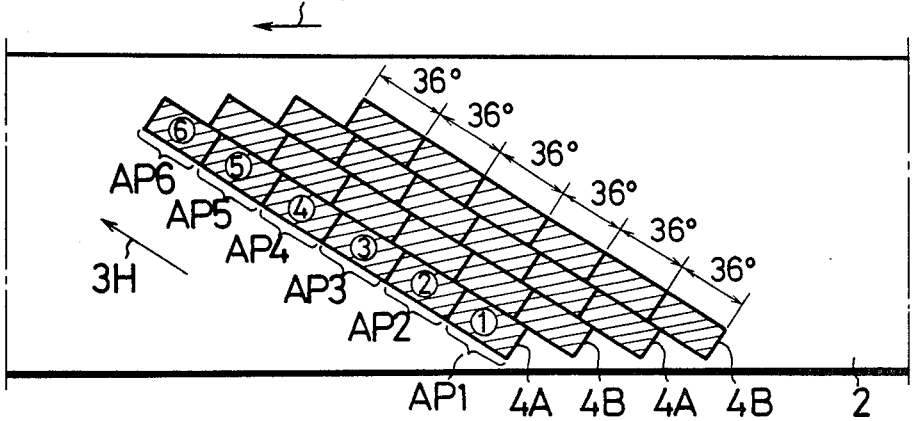

In other words, the audio signal is digitized, the resulting digital signal is divided into 132 blocks for each field period thereof, the parity words P and Q, each of which is an error correction code, are generated, and the CRC code is generated for each block. Then, the data of one field period is time compressed to about 1/5 its original duration by a PCM area signal formed on the basis of the switching signal RFSW, the block synchronizing signal SYNC and the block address signal ADRS are added to each block, each block is formed as the data series shown in FIG. 9 and this block is read as one of the blocks in the sequence shown in FIG. 9. The PCM data thus read are modulated to a signal having a frequency of 5.8 MHz if the data is "1" and to a signal having a frequency of 2.9 MHz if the data is "0". The modulated signal is supplied from PCM audio signal processor 62 through switching circuit 35, whereby, in response to the changing-over of switching circuit 32 by switching signal RFSW, the modulated PCM audio signal is recorded in the area AP of a track 4A by rotary head HA and in the area AP of a track 4B by rotary head HB, as shown in FIG. 2.

Figure 5:
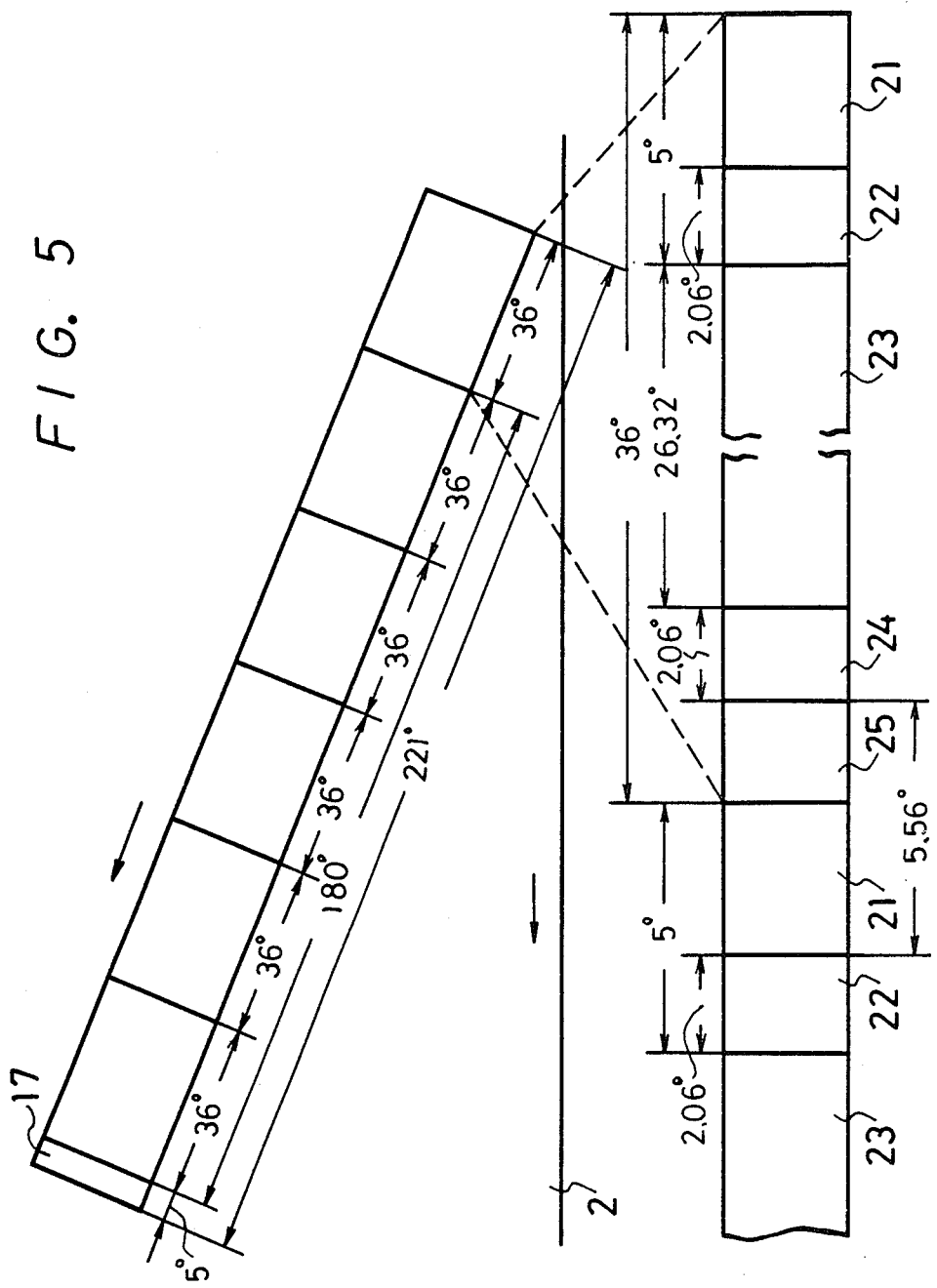
Figure 6:
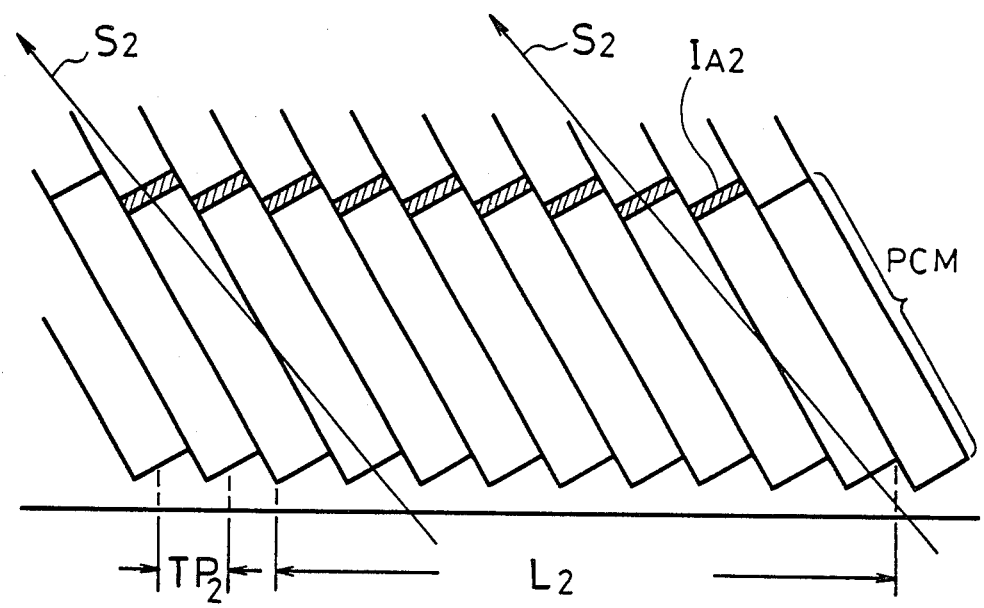
FIGS. 6 and 7 are schematic diagrams to which reference is made in explaining the relationship between tape speed and the pattern in the recording mode.
Figure 7:
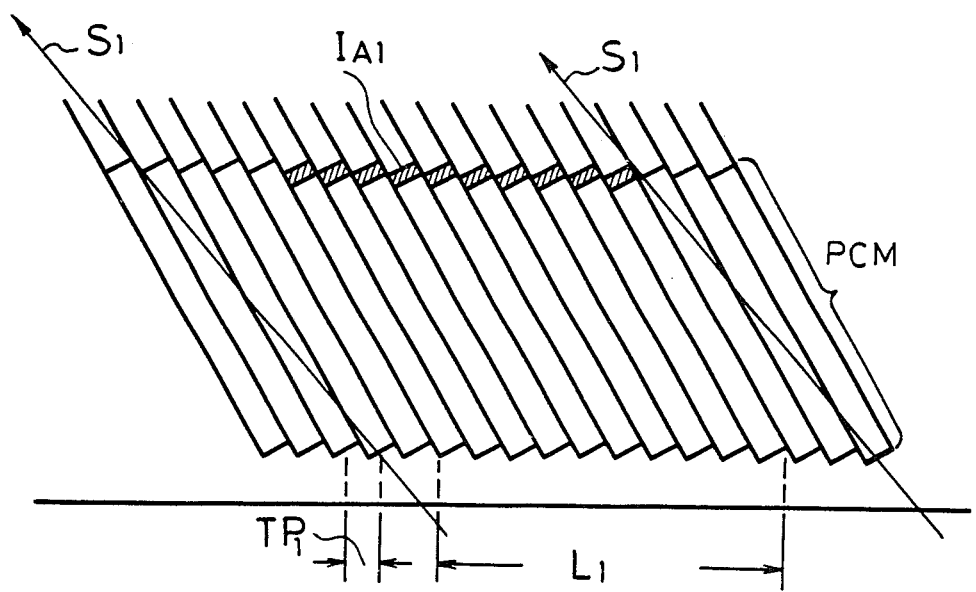

In the multi-PCM mode, the movable contact of switch 34 is engaged with its contact M to thereby allow phase shifter circuit 45 to generate a head switching signal RFSW whose phase is shifted by a whole multiple of 36° in accordance with a specified PCM area, and from which a PCM area specifying signal is derived. Accordingly, the PCM audio signal is recorded in a specified one of the segment track areas AP1 to AP6 shown in FIG. 5.

The reproducing mode of the apparatus will now be described. In the reproducing or playback mode, the rotary phase of the rotary drum is again servo-controlled on the basis of the pulse signal PG generated from pulse generator 43.

In the case of the 8 mm video tape recorder, tracking pilot signals (not shown) of a so-called 4 frequency system are cyclically recorded on each of the tracks 4A and 4B so that, during reproducing, tracking servo is effected with reference to the 4 frequency system tracking pilot signals.

The 8 mm video tape recorder is also shown to be provided with an erase rotary head FE (FIG. 8) having a gap width about twice the gap width of the rotary heads HA and HB. In the playback mode, the reproduced output from this erase rotary head FE is supplied to a pilot signal extracting circuit 91 which extracts a pilot signal component. The resulting pilot signal component is supplied to a mode judging circuit 92 which determines therefrom, whether the recording track being played back is in accordance with the SP mode or the LP mode. A technique for judging whether a track was recorded in the SP mode or the LP mode by using the pilot signal component in the reproduced output from erase rotary head FE, is disclosed by the assignee of the present application in Japanese Patent application No. 87636/1984. This previously proposed technique utilizes the fact that the track pitch in the SP mode is different from the track pitch in the LP mode so that the pilot signal components contained in the reproduced output played back by the erase rotary head FE are different for the respective modes.

The output MJ from mode judging circuit 92 is supplied to a system controller (not shown) by which the tape speed in the playback mode is made equal to that in the recording mode.

In the playback mode, the reproduced signal outputs from rotary heads HA and HB are respectively supplied through playback amplifiers 47A and 47B to switching circuit 33. Switching circuit 33 is changed-over in response to switching signal RFSW so that the video signal from the area AV of each track is supplied to video signal system 50 and the PCM data from the area AP of each track is supplied to PCM signal system 60.

In video signal system 50, the video signal is demodulated and then delivered to an output terminal 52.

On the other hand, in PCM signal system 60, the reproduced PCM data is supplied through a playback equalizer circuit 63 and a limiter circuit 64 to a bit synchronizing circuit 65. This bit synchronizing circuit 65 is formed of a D-type flip-flop circuit 66 and a PLL (phase locked loop) circuit 67. From D-type flip-flop circuit 66, there is derived the data "1" or "0" modulated as mentioned before. The resulting data is supplied to PCM audio signal processor 62 in which it is error detected, error corrected and so on, and thereafter it is re-converted to left and right channel analog audio signals. These left and right channel analog audio signals are provided at output terminals 68L and 68R, respectively The switching circuit 35 is changed over from its normal position engaging contact N to a position engaging a contact $I_{dx}$ during scanning of an index area. Further, a switching circuit 36 is adapted to selectively apply to contact $I_{dx}$ either an index signal or an erasing signal in response to a switching signal SW when the index signal is inserted or erased, respectively.

In the case of the illustrated example, the index signal is a single tone signal having a frequency of 2.9 MHz and which is generated by an oscillator 71. Further, in the illustrated example, the erasing signal is a single tone signal having a frequency of 5.8 MHz, and which is provided by an oscillator 72.

A circuit 80 is provided for generating an index area specifying signal. When the index signal is written in the postamble area 14 or 24 and the apparatus is in the playback mode, or when the index signal is to be erased, the index area specifying signal is generated by circuit 80, as follows:

Reproduced data S1 (FIGS. 10A and 10B) which is bit-synchronized and derived from D-type flip-flop circuit 66 in PCM signal system 60 is supplied to a demodulating circuit 81 and to a block synchronizing signal detecting circuit 82 in generating circuit 80. When the block synchronizing signal SYNC is detected in circuit 82, the latter generates a latch pulse S2 (FIG. 10C) at a time corresponding to the last bit of the address data ADRS demodulated by demodulating circuit 81. Then, the address data ADRS of 8 bits is latched in a latch circuit 83 by latch pulse S2. A latch output S3 (FIG. 10D) is supplied to a preset terminal of a counter 85.

The data demodulated by demodulator 81 is also supplied to an error detection circuit 84 in which any error is detected in every block through use of the CRC code. Since the CRC code is generated for the words including the address data ADRS upon recording, if the address data ADRS has an error, such error of the address data ADRS is detected.

The latch pulse S2 from block synchronizing signal detecting circuit 82 is also supplied to error detection circuit 84 as a calculation start pulse and thereby the calculation for error detection is initiated. When an absence of error is detected by circuit 84, the latter generates a pulse S4 (FIG. 10E). The counter 85 is loaded by this pulse S4 with the address value from latch circuit 83 which is preset in counter 85.

A clock pulse of one block period is supplied to counter 85 from a clock generator 86. Accordingly, once counter 85 is loaded and preset with the address value from latch circuit 83, even if the following data are all erroneous, counter 85 increments from its preset value at every data block in response to the clock pulse from generator 86. Needless to say, if a data block does not contain any error, the pulse S4 is generated by error detection circuit 84 in response to each such block so that the address data ADRS is preset in counter 85 for each block. At such time, the clock pulse is neglected by counter 85.

A counted value S5 (FIG. 10F) from counter 85 is supplied to a decoder 87 which detects when the counter value S5 becomes the last address of the data block, that is, the address 131, and then generates a detection pulse S6 (FIG. 10G). A monostable multivibrator 88 is triggered by detection pulse S6 to provide an index area signal S7 (FIG. 10H).

Alternatively, it may be possible that the decoder 87 generates the detection pulse S6 when the counted value S5 of counter 85 becomes, for example, "133" (taking a spare into consideration), rather than "131".

In either case, the obtained index area signal S7 is supplied through a gate circuit 94 to switching circuit 35 as a switching signal for the latter so that switching circuit 35 is changed over from contact N connected with PCM audio signal processor 62 to contact $I_{dx}$ connected to switching circuit 36. The index area signal S7 passed through gate circuit 94 is also supplied through OR gate 42 as a switching signal for recording and/or reproducing change over switching circuits 31A and 31B with the result that, during the scanning of each index area, switching circuits 31A and 31B are engaged with the respective recording terminals REC.

Accordingly, when the index signal is to be inserted or recorded, switching circuit 36 is in the illustrated position, and the index signal having the frequency of 2.9 MHz is recorded on a track being scanned in its postamble area specified by index area S7. On the other hand, in the erasing mode, that is, when a previously recorded index signal is to be erased, switching circuit 36 is changed over to the position opposite to that illustrated so that the erasing signal having the frequency of 5.8 MHz is supplied to the head HA or HB during the period specified by the index area signal S7 and thereby the previously recorded index signal is erased.

The gate circuit 94 controls the length of time during which index area signals S7 are allowed to pass therethrough for recording or inserting index signals or erasing previously recorded index signals. The gate circuit 94 is suitably controlled, for example, opened by a gating signal GT from an insertion time generating circuit 93. This insertion time generating circuit 93 is supplied with the SP/LP mode judging signal MJ from the mode judging circuit 92 and which controls a switch 95. If switch 95 is turned ON or closed when the index signal is being inserted or erased, the resulting gating signal GT from circuit 93 opens gate circuit 94 for a predetermined time period which is, for example, twice as long as the period during which gating signal GT opens gate circuit 94 if switch 95 is OFF or opened. In this case, the switch 95 is closed in response to signal MJ indicating the LP mode, so that gate circuit 94 is opened during a time period which is twice that when the mode judging signal MJ indicates the SP mode. For example, in the SP mode, gate circuit 94 is opened by gating signal GT for 3 seconds, while, in the LP mode, gate circuit 94 is opened for 6 seconds by the gating signal GT. Then, during the period in which gate circuit 94 is opened, each index area signal S7 is passed through gate circuit 94, whereby as mentioned before, the index signal is recorded in the respective index area or the recorded index signal is erased therefrom.

Also, in the multi-PCM mode, by changing over switching circuit 34 from contact N to contact M, it is possible to record or erase an index signal in an area suitably identified by index area signal S7 in a manner similar to that described above.

The recording mode signal SM applied to terminal 41 is also supplied to insertion time generating circuit 93, whereby, in the recording mode, gate circuit 94 is maintained open by the output signal GT from generating circuit 93. Therefore, in the recording mode, and in response to the switched state of switching circuit 36, an index signal having the frequency of 2.9 MHz or a postamble signal having the frequency of 5.8 MHz is recorded in the postamble area.

Though not shown, when no address data is detected or when the address data are all erroneous and the signal S4 can not be obtained, it is possible to form the index area signal from the head switching signal RFSW.

Although, in the above described embodiment, the postamble signal has the frequency of 5.8 MHz, which also represents the binary code signal of "1" so that the frequency of 2.9 MHz is used for the index signal, the index signal is not limited thereto, and a signal having a pattern which does not appear as the data may be used.

Further, it is possible to record coding data as the index signal. If the coding is carried out as described above, it is possible to record, in addition to data indicative of the starting point of a tune, data indicative of an intermediate portion of the tune, and other data, such as, data representing tape speed, time information and so on, as the index signal.

Furthermore, it is needless to say that this invention is not limited to the apparatus for recording and/or reproducing a PCM audio signal but can be applied to other apparatus for recording and/or reproducing various kinds of information.

Generally, in accordance with the present invention as set forth above, when the track pitches are made different by the use of different tape speeds and the like during recording, the index signal is inserted or recorded for periods of time that correspond to the different track pitches so that, in the high speed search mode, the index signal can be satisfactorily picked up or detected with either track pitch.

Although a single preferred embodiment of the invention has been described in detail with reference to the drawings, it will be apparent that the invention is not limited to that precise embodiment, and that many modifications and variations could be effected therein by one skilled in the art without departing from the spirit or scope of the invention as defined by the appended claims.

What is claimed is:

1. A helical scan apparatus having rotary heads for recording and/or reproducing video and audio signals in oblique tracks on a magnetic tape with the recorded audio signal being arranged in an extended end portion of each of said oblique tracks which otherwise contains the recorded video signal and with the pitch of said oblique tracks being different for different modes characterized by respectively different tape advancement speeds, said apparatus comprising:

means for detecting the one of said different recording modes used for recording said video and audio signals on said magnetic tape; means for generating index signals; means responsive to signals reproduced by said rotary heads from the extended end portions of said oblique tracks for generating index area signals; means for generating a recording period signal having a duration determined according to said one of the recording modes detected by said recording mode detecting means; index signal recording means for transmitting said index signals to said rotary heads for recording by the latter on said magnetic tape; and control means for controlling said index signal recording means so that said rotary heads record said index signals at postions determined by said index area signals in said extended end portions of a plurality of said oblique tracks in series during a time period determined by said duration of the recording period signal.

2. The apparatus according to claim 1; in which said audio signals are PCM (pulse-code modulated) audio signals and said index signals are binary code signals.

3. The apparatus according to claim 2; in which said PCM audio signals comprise a preamble, PCM audio data including address data and a postamble, and said index signals are recorded at said postamble.

4. The apparatus according to claim 3; in which said index area signal is generated on the basis of said address data in said PCM audio data derived from said signals reproduced by said rotary heads.

5. The apparatus according to claim 4; in which said control means includes a gate circuit which passes therethrough said index area signal during a period determined by said recording period signal, the output of said gate circuit controlling the supplying of said index signals from said index signal generating means to said index signal recording means.

6. The apparatus according to claim 5; in which there are two of said recording modes, said track pitch in one of said recording modes is twice the pitch of the tracks in the other of said recording modes, and the duration of said recording period signal for said one recording mode is one-half the duration of said recording period signal for said other recording mode.

7. The apparatus according to claim 1; further comprising means for generating erase signals, and means for applying said erase signal to said index signal recording means in place of said index signals in response to said index area signals for erasing index signals previously recorded at said positions determined by said index area signals.

8. The apparatus according to claim 7; in which said audio signals are PCM audio signals recorded as signals of first and second frequencies, respectively, representing the different logic levels of binary code data; and in which said index and erase signals are derived from signals of first and second frequencies, respectively.

* * * * *